May 29, 1951  H. D. MORRIS ET AL  2,554,680
GARDENING TOOL CARRYING KIT
Filed Aug. 16, 1949
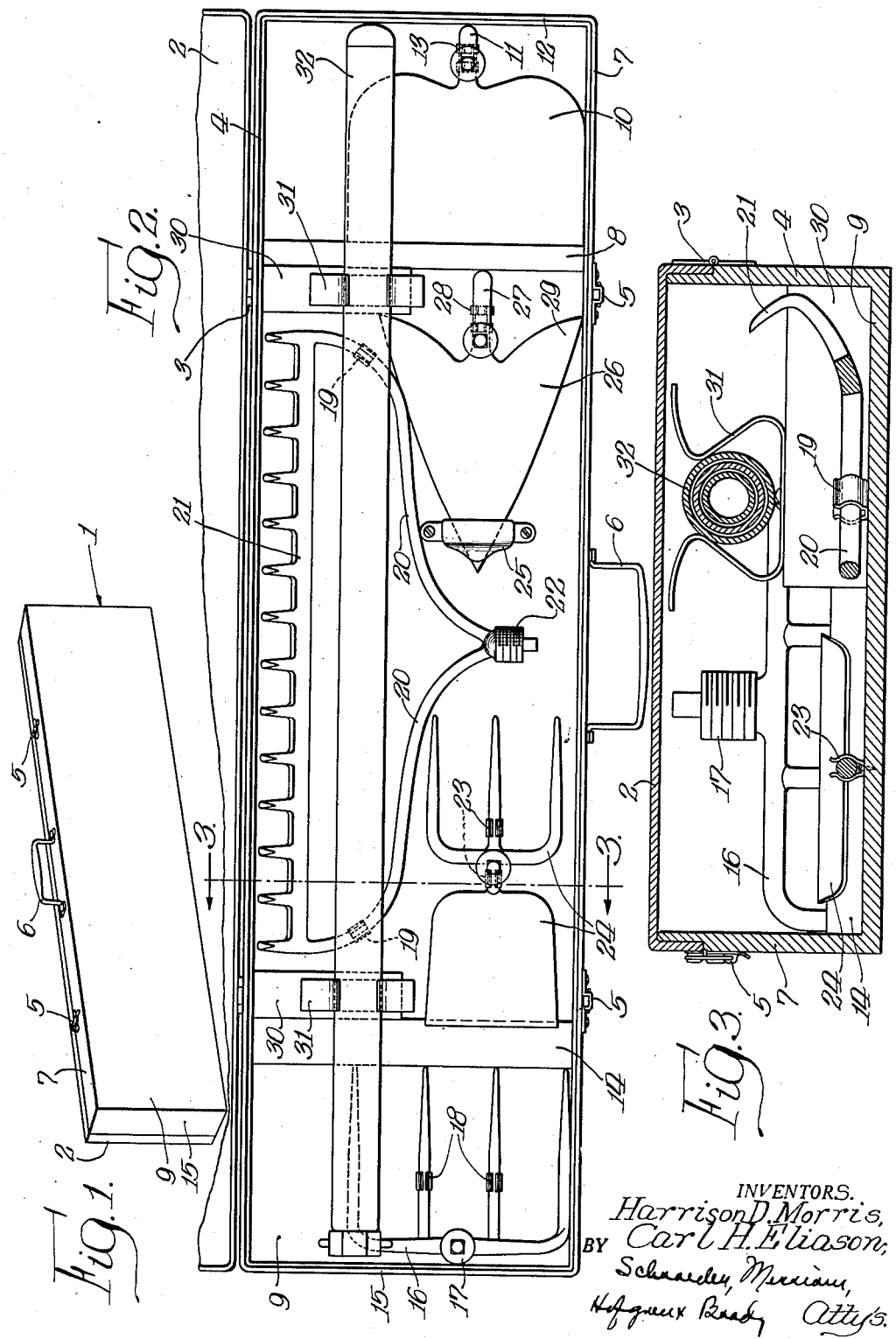
INVENTORS.
Harrison D. Morris,
Carl H. Eliason,
BY Schroeder, Merriam,
Hofgren Brady Attys.

Patented May 29, 1951

2,554,680

UNITED STATES PATENT OFFICE 2,554,680

GARDENING TOOL CARRYING KIT

Harrison D. Morris and Carl H. Eliason,
Grayslake, Ill.

Application August 16, 1949, Serial No. 110,623

3 Claims. (Cl. 206—16)

This invention relates to a carrying kit for gardening tools, and more particularly to a carrying kit wherein retaining devices are provided to receive a number of gardening tools in a compact arrangement within the kit, the normally long handled tools being attachable to and detachable from a common handle.

The primary object of this invention is to provide a gardening tool carrying kit adapted to receive a plurality of gardening tools and a handle for the tools in a prescribed compact arrangement.

Another object of this invention is to provide a gardening tool carrying kit in which each gardening tool may be separately removed from the kit without removing any other tool.

A further object is the provision of a gardening tool carrying kit wherein each tool is received and firmly but releasably held in a predetermined fixed position enabling the kit to be loaded in one position, carried in another position and stand in still another position without having the tools displaced from their proper assigned position.

Other objects and advantages of this invention will become apparent from the following detailed description taken in connection with the accompanying drawings, in which:

Fig. 1 is a perspective view of the carrying kit of this invention;

Fig. 2 is a top plan view showing the interior of the kit with certain gardening tools properly placed therein; and Fig. 3 is a cross-sectional view taken on line 3—3 in Fig. 2.

The carrying kit of this invention is elongated, shallow and box-like having a main portion 1 and a lid 2 which is secured by means of hinges 3 to one of the side walls 4 of the main portion 1, herein the rear wall as viewed in Fig. 2. Suitable hasps 5 are provided for securing the lid in closed position. The kit can be constructed of metal, wood, plastic or any other lightweight but sturdy materials in order that the kit with the tools therein is easily portable but it is preferably made of sheet metal. A handle 6 is provided here shown attached to the side wall 7 so that when the kit is being carried it takes the position shown in Fig. 1 wherein the smallest dimension is laterally of the person carrying the kit.

It is important in a tool kit that the arrangement of the tools be such as to accommodate the maximum number and at least all necessary tools while providing easy access to and removal of any tool without the necessity of removing others. The tools should also be firmly held in position yet be capable of removal from or replacement in position by the simple application of force without the necessity of manipulating or adjusting some retaining means.

To that end a first tool retaining strip 8 is disposed transversely of a wall 9 of the main portion 1 (the bottom as viewed in Figs. 2 and 3) spaced inwardly from one end thereof a distance such that a hoe 10 may be received snugly with the blade resting against the strip 8 and the shank 11 of the hoe bearing against an end wall 12 of the main portion. Upstanding from the bottom wall 9 closely adjacent the end wall 12 is a spring clip 13 adapted releasably to receive a portion of the shank 11 of the hoe when the latter is placed generally parallel with the bottom wall 9 with the shank 11 extending upwardly. The spring clip 13 holds the hoe in its proper position with the blade thereof against the bottom wall of the kit. Preferably the spring clip 13 is spaced from the front side wall 7 a distance such that one side edge of the hoe bears against the front wall.

A second tool retaining strip 14 is spaced from the remaining end wall 15 a distance substantially equal to the greatest dimension of a tined cultivator measured from the shank thereof to the points of the tines. A tined cultivator 16 is placed between the second retaining strip 14 and the end wall 15 so that the shank 17 thereof abuts the end wall 15 and the points of the tines rest against the retaining strip with the shank extending upwardly from the bottom wall 9. A pair of spring clips 18 are attached to the bottom wall 9 extending upwardly to engage the tines of the cultivator to hold the cultivator in its proper position within the kit. The spring clips 18 are preferably positioned so that one lateral edge of the cultivator is disposed closely adjacent to the side wall 7 (the front wall, as viewed in Fig. 2).

A pair of spring clips 19 are positioned on the bottom wall 9 between the retaining strips 8, 14 to releasably receive the diverging arms 20 of a rake 21. The spring clips 19 position the rake 21 with the teeth thereof abutting the side wall 4 with the teeth extending upwardly from the bottom wall and the shank 22 of the rake extending towards the side wall 7.

Another pair of spring clips 23 are disposed near the front wall 7 and the second retaining strip 14 to releasably receive respectively the shank and one tine of a combination hoe and cultivator implement 24 while holding the blade of the hoe part thereof against the retaining strip 14. The spring clips 23 are aligned in the longitudinal direction of the kit to retain the hoe-cultivator implement 24 aligned longitudinally of the kit and positioned near the front wall 7 as viewed in Fig. 2.

A strap 25 is positioned near the front wall 7 and spaced from the retaining strip 8 to receive the point of a triangular shaped hoe 26 with the shank 27 thereof resting against the retaining strip 8. Aligned with the strap 25 is a spring clip 28 adapted releasably to receive a portion of the shank of the triangular shaped hoe and position the hoe with one blade point 29 resting against the front wall 7 of the kit. The rake, hoe-cultivator combination implement and the triangular shaped hoe are thus positioned on the bottom of the kit between the retaining strips so that any one of the implements may be removed from the kit without first removing another of the implements.

Adjacent to each retaining strip is placed a block 30 which extends upwardly above the retaining strips and part way across the kit from the rear wall 4 toward the front wall 7. A large spring clip 31 is mounted on the top surface of each block 30 and is adapted releasably to receive a handle 32 which may serve as a common handle for all of the implements carried in the kit. The spring clips 31 hold the handle 32 at a distance above the bottom wall 9 of the kit so as to clear the implements which are held in position on the bottom wall.

From the foregoing it is seen that we have invented an improved kit providing a compact arrangment for garden tools, and also providing easy access to each implement without first removing other implements. The kit is easily portable and convenient for the user.

We claim:

1. A kit for garden tools which are detachable from a common handle comprising, in combination, an elongated, narrow and shallow main portion having a bottom, side and end walls, a closure hingedly connected to one of the side walls of said main portion, a first tool retaining strip extending transversely of the bottom wall spaced from an end wall a distance equal to the maximum dimension of a hoe from the cutting edge thereof to the shank so as to receive a hoe snugly between said strip and the adjacent end wall with the cutting edge of the hoe bearing against said strip, a spring clip secured to and projecting upwardly from the bottom wall positioned and adapted releasably to receive a portion of the shank of a hoe when properly positioned in the kit, a second tool retaining strip extending transversely of the bottom wall spaced from the remaining end wall a distance equal to the maximum dimension of a cultivator from the points of the tines to the shank so as to receive a cultivator snugly between said second strip and the adjacent end wall with the points of the tines bearing against said second strip, a plurality of spring clips secured to and projecting upwardly from the bottom wall adapted releasably to receive a plurality of tines when a cultivator is properly positioned in the kit, a pair of spring clips disposed in a line parallel with the principal axis of the kit, one of said pair of clips being spaced from said second retaining strip a distance equal to the hoe portion of a combination hoe and cultivator to receive releasably the shank of such a combination tool when the hoe portion is positioned with the cutting edge in engagement with said second retaining strip, the other one of said pair of spring clips being adapted releasably to engage one of the tines of the cultivator portion, a strap secured to the bottom wall for the reception of the apex of a triangular blade hoe, a spring clip in longitudinal alignment with said strap to receive the shank of such a triangular blade hoe, the strap being spaced from said first retaining strip a distance such that when the tip of the hoe is received under the strap the shank abuts said first retaining strip, a pair of spring clips extending upwardly from the bottom wall and disposed with their axis at an angle to the longitudinal axis of the kit to receive releasably therein the diverging arms of a rake positioned with the teeth adjacent the rear wall of the kit, and a pair of blocks extending transversely of the bottom wall partially across the bottom wall and upwardly above said retaining strips, each having a large spring clip for releasably receiving a handle.

2. A kit for garden tools which are detachable from a common handle comprising, in combination, an elongated, narrow and shallow main portion having a bottom, side and end walls, a closure hingedly connected to one of the side walls of said main portion, a first tool retaining strip extending transversely of the bottom wall spaced from an end wall a distance equal to the dimension of a hoe from the cutting edge thereof to the shank, a spring clip mounted on the bottom wall adapted to receive releasably a portion of the shank of a hoe positioned with the shank thereof bearing against an end wall and the cutting edge thereof abutting said retaining strip, a second tool retaining strip extending transversely of the bottom wall spaced from the remaining end wall so as to receive a cultivator snugly between said second strip and the adjacent end wall with the points of the tines bearing against said second strip, a plurality of spring clips mounted on the bottom wall adapted to releasably receive a plurality of tines when a cultivator is properly positioned between said second strip and the adjacent end wall, a pair of spring clips mounted on said bottom wall positioned near the front wall to receive releasably the shank of a combination hoe and cultivator when the hoe portion is positioned with the cutting edge in engagement with said second retaining strip, a strap secured to the bottom wall transversely thereof for the reception of the apex of a triangular blade hoe positioned with the shank thereof abutting said first retaining strip, a spring clip in longitudinal alignment with said strap for releasably receiving the shank of such a triangular blade hoe, a pair of spring clips extending upwardly from the bottom wall to receive releasably therein the diverging arms of a rake positioned with the teeth adjacent the rear wall of the kit, and a pair of blocks extending transversely of the bottom wall partially across the bottom wall and upwardly above said retaining strips, each having a large spring clip for releasably receiving a handle.

3. A kit for garden tools which are detachable from a common handle comprising, in combination, a shallow, elongated and narrow main portion having a bottom, side and end walls, a first tool retaining strip extending transverse the bottom wall spaced from an end wall to snugly receive a hoe between the strip and the end wall, a spring clip positioned on the bottom near the end wall to releasebly receive the shank of a hoe, a second tool retaining strip extending transverse the bottom wall spaced from the remaining end wall to snugly receive a cultivator between said strip and end wall, a plurality of spring clips positioned on the bottom wall between said second strip and remaining end wall to releasably receive the tines of a cultivator, a pair of spaced spring clips mounted on the bottom wall near the rear side wall centrally of the kit for releasably receiving the diverging arms of a rake and to position the teeth of a rake against said rear side wall, a pair of spring clips aligned longitudinally of the kit near the front wall thereof for releasably receiving a combination hoe and cultivator implement positioned near said second retaining strip, and a strap and spring clip mounted on the bottom wall near said front wall for releasably receiving respectively the point and shank of a triangular blade hoe positioned near said first retaining strip and a pair of blocks extending transversely of the bottom wall partially across the bottom wall and upwardly above said retaining strips, each having a large spring clip for releasably receiving a handle.

HARRISON D. MORRIS.
CARL H. ELIASON.

REFERENCES CITED

The following references are of record in the file of this patent:

UNITED STATES PATENTS

| Number | Name | Date |
|---|---|---|
| 305,544 | Stirrup | Sept. 23, 1884 |
| 348,630 | Keller | Sept. 7, 1886 |
| 513,044 | Handlan, Jr. | Jan. 16, 1894 |